Patented Jan. 27, 1948

2,435,014

UNITED STATES PATENT OFFICE 2,435,014

HALOGENATED CONDENSATION PRODUCTS

Joseph B. Niederl, Brooklyn, N. Y.

No Drawing. Application April 19, 1945,
Serial No. 589,261

1 Claim. (Cl. 260—619)

This invention relates to condensation products of poly-halogenated carbonyl compounds with long-chain substituted phenols, such condensation products being insecticides and fungicides, as well as bactericides. This combination of highly desirable properties is obtained by condensing poly-halogenated carbonyl compounds with phenols possessing initially high phenol coefficients.

More particularly, this invention relates to the condensation products of poly-halogenated carbonyl compounds possessing at least one trihaloaceto group (CX₃CO—) with phenols having a *tt*-octyl group ((CH₃)₃CCH₂C(CH₃)₂—; α,α,γ,γ-tetramethyl-butyl, or "diisobutyl" group) as the side chain or as one of the side chains (J. B. Niederl et al., Journ. Am. Chem. Soc., vol. 55, p. 2571 (1933)), such phenols being known to possess phenol coefficients of about 150 (J. B. Niederl, Ind. Eng. Chem., vol. 30, p. 1273 (1938)).

In general the chemical nature of the condensation products embodied in this invention may be expressed by the formula given below:

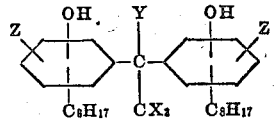

in which X represents halogen (chlorine, bromine, or iodine); while Y signifies: hydrogen, a plain or a halogenated alkyl radical such as methyl, trichloro methyl, tribromo methyl, triiodo methyl, ethyl, n-propyl, iso-propyl, n-butyl, iso-butyl, sec. butyl, tert. butyl, etc. a plain or a halogenated aryl radical such as phenyl, chloro-, bromo- or iodophenyl, an aralkyl radical such as benzyl, phenyl-ethyl, phenyl-propyl, or an acid radical, such as: —(CH₂)$_x$COOH;

—(CH₂)$_x$COOR etc., while Z designates hydrogen, halogen, a nitro group, a carboxyl group, a short chain alkyl radical such as: methyl, ethyl, etc., an aryl radical such as phenyl, an aralkyl radical such as benzyl, a cyclo-alkyl radical such as cyclohexyl, or an alkoxy group, such as: methoxy, ethoxy, etc., and $x$ is a number from 1–16.

These compounds are produced by condensing two mols of a *tt*-octyl-phenol or -naphthol with one mol of the poly-halogenated carbonyl compound and the reaction may be illustrated as follows using *tt*-octyl-phenol ("diisobutylphenol") and chloral as an example:

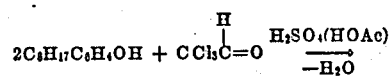

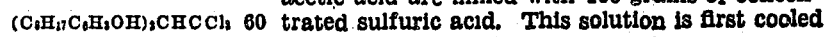

The *tt*-octylphenols utilized in this invention comprise specifically the following compounds: p-*tt*-octylphenol; 2-chloro-4-*tt*-octylphenol; 2-bromo-4-*tt*-octylphenol; 2-iodo-4-*tt*-octylphenol; 2,6-dichloro-4-*tt*-octylphenol; 2-6-dibromo-4-*tt*-octylphenol; 2,6-di-iodo-4-*tt*-octylphenol; 2-nitro-4-*tt*-octylphenol; 2-methyl-4-*tt*-octylphenol; 3-methyl-4-*tt*-octylphenol; 4-methyl-2-*tt*-octylphenol; 2-chloro-5-methyl-4-*tt*-octylphenol; 2-bromo-5-methyl-4-*tt*-octylphenol; 2-iodo-5-methyl-4-*tt*-octylphenol; 2,3-dimethyl-4-*tt*-octylphenol; 2,5-dimethyl-4-*tt*-octylphenol; 2-ethyl-4-*tt*-octylphenol; 3-ethyl-4-*tt*-octylphenol; 4-ethyl-2-*tt*-octylphenol; 2-methoxy-4-*tt*-octylphenol; 3-methoxy-4-*tt*-octylphenol; 4-methoxy-2-*tt*-octylphenol; 2-chloro-5-methoxy-4-*tt*-octylphenol; 2-bromo-5-methoxy-4-*tt*-octylphenol; 2-iodo-5-methoxy-4-*tt*-octylphenol; and *tt*-octyl-α- and β-naphthols, as well as *tt*-octyl substituted hydroxy-benzoic acids (*tt*-octyl-salicylic acid), etc.

The poly-halogenated carbonyl compounds utilized in this invention comprise the following compounds: chloral and chloral hydrate (trichloro-acetaldehyde); tri-bromo-acetaldehyde; tri-ido-acetaldehyde; α,α,α-trichloro-acetone (1,1,1-trichloro-propanone); 1,1,1-tribromo-propanone; 1,1,1-tri-iodo-propanone; hexa chloro acetone, hexa bromo acetone, hexa iodo acetone; 1,1,1,-trichloro-butanone-2; 1,1,1-tribromo-butanone-2; 1,1,1-tri-iodo-butanone-2; 1,1,1,-trichloro-3,3-dimethyl-butanone-2; 1,1,1-tribromo-3,3-dimethyl-butanone-2; 1,1,1-tri-iodo-3,3-dimethyl-butanone 2; ω,ω,ω-trichloro-acetophenone; ω,ω,ω-tribromo-acetophenone; ω,ω,ω-tri-iodo-acetophenone; 1,1,1-trichloro-hexadione-2,4; 1,1,1,6,6,6-hexa chloro-hexadione-2,4; trichloro methyl-p-chlorophenyl ketone; trichloro methyl -p-bromophenol ketone; trichloro methyl-p-iodophenyl ketone; γ,γ,γ-trichloro acetoacetic acid and its esters.

The most convenient condensing agents to use are hydrogen chloride, sulfuric acid and benzenesulfonic acid, but acidic metal salts, such as boron trifluoride, aluminum chloride, or zinc chloride might also be employed. These catalyzers might be used with or without an inert solvent such as glacial acetic acid, propionic acid and others.

*Example 1.—β,β,β-trichloro-α,α-bis (2-hydroxy-3-methyl-5-tt-octylphenyl) ethane*

Two-tenths mol (44 grams) of 2-methyl-4-*tt*-octylphenol (diisobutyl-o-cresol) is melted together with 0.1 mol (14.6 grams) of chloral (trichloro acetaldehyde) or chloral hydrate (16.4 grams). In a separate vessel, 80 grams of glacial acetic acid are mixed with 160 grams of concentrated sulfuric acid. This solution is first cooled externally in ice water and is then slowly added to the phenol-aldehyde mixture which has also been cooled externally in a similar manner. The reaction mixture is well shaken to assure complete mixing and is then allowed to stand at a temperature of about 0° for several hours. As maximum viscosity is reached the mixture is poured into ice water, or if it is too thick, pieces of ice are added to the reaction material. Formation of heat is avoided throughout the entire condensation process. Finally the material is broken up, well washed with cold water and then with boiling water, and then separated by filtration, decantation or centrifuging. It is then allowed to dry in air. At this stage the reaction product is a waxy solid, pure enough for most uses. It may be further purified by crystallization from suitable organic solvents such as ethyl alcohol, ethyl acetate, chloroform, benzene, diisobutylene or glacial acetic acid. The melting point is 125° C.

*Example 2.—$\beta,\beta,\beta$-trichloro-$\alpha,\alpha$-bis (2-hydroxy-3-methoxy-5-tt-octylphenyl) ethane*

Two-tenths mol (47.2 grams) of 2-methyl-4-$tt$-octylphenol (diisobutyl-guaiacol) are dissolved with warming in 100 cc. of glacial acetic acid. To this solution is added 0.1 mol (14.6 grams) of freshly distilled chloral (trichloro acetaldehyde). Dry hydrogen chloride gas is then passed into the mixture until saturated. The mixture is then set aside and the saturation with dry hydrogen chloride is repeated every 24 hours for a week. After this time the reaction mixture is poured into cold water whereby an oil or semi-solid separates out. The reaction product is then removed from the supernatant aqueous layer and repeatedly treated with hot distilled water until free from acetic acid, hydrogen chloride and any unreacted chloral. At this stage the reaction product is pure enough for most practical uses. It may be further purified as directed in Example 1. Its melting point is 115°–118° C.

*Example 3.—$\alpha,\alpha,\alpha$-trichloro-$\beta,\beta$-bis (2-hydroxy-5-tt-octylphenyl) propane*

Two-tenths mol (41.2 grams) of p-$tt$-octylphenol (diisobutylphenol) is dissolved with warming in 50 cc. of glacial acetic acid. To this solution is added 0.1 mol (16 grams) of $\alpha,\alpha,\alpha$-trichloro acetone. The solution is then externally cooled in an ice water bath. To this ice cold mixture is then added approximately 0.3 mol (about 30 grams) of concentrated sulfuric acid. After thorough mixing, the cold reaction mixture is allowed to gradually come to room temperature and is then allowed to stand for about a week. After this time the mixture is poured into water and the reaction material which thus separates out is worked up and purified as described in Example 1. M. P. 130–135°.

Utilizing $\omega,\omega,\omega$-trichloro-acetophenone instead of the $\alpha,\alpha,\alpha$-trichloro acetone in the above reaction produces the $\beta,\beta,\beta$-trichloro-$\alpha$-phenyl-$\alpha,\alpha$-bis (2-hydroxy-5-$tt$-octylphenyl) ethane. M. P. 152°–157° C.

*Example 4.—$\alpha,\alpha,\alpha,\gamma,\gamma,\gamma$-hexachloro-$\beta,\beta$-bis (2-hydroxy-5-tt-octylphenyl) propane*

Two-tenths mol (41.2 grams) of p-$tt$-octylphenol (diisobutylphenol) are melted and then intimately mixed with 0.1 mol (26.2 grams) of hexachloro acetone. This mixture is then cooled externally in an ice-salt mixture. Under constant stirring and while the temperature of the reaction mixture is kept at zero degree or below, seventy grams of cold concentrated sulfuric acid is added in small amounts. After completion of the addition of the sulfuric acid the reaction mixture is set aside for several days. After the mixture has become very thick and almost semi-solid, it is poured into ice water or pieces of ice are added to the condensation mixture. Finally the condensation product is broken up, washed with cold water and then repeatedly washed with boiling water. The product is then separated and dried as described in Example 1. Further purification is effected by crystallization from suitable organic solvents. M. P. 240° C.

The foregoing examples do not imply that for each particular phenol and poly-halogenated carbonyl compound a specific catalyzer has to be used, they merely indicate that for the compounds mentioned the given method appeared to give the better results as indicated by yield and purity of condensation products as well as absence or minimum formation of polymers. Thus, diisobutylphenol is condensed with chloral in the presence of dry hydrogen chloride gas, while analogously diisobutyl-o-cresol can be condensed with any of the given poly-halogenated ketones using conc. sulfuric acid with or without a solvent. Properly blockblocked phenols (J. B. Niederl et al., Journ. Am. Chem. Soc., vol. 63, p. 1731 (1941)) such as the 2-methyl- or 2-methoxy-, or 2-chloro-4-$tt$-octylphenols give the purest condensation products as the formation of undesirable polymers is sterically prevented.

Of the large number of halogenated condensation products possible under this invention, the following may be considered as typical:

| Name of Condensation Product | Formula | Prepared from— |
|---|---|---|
| $\beta,\beta,\beta$-Trichloro-$\alpha,\alpha$-bis (2-hydroxy-5-$tt$-octylphenyl) ethane. | $((CH_3)_3CCH_2C(CH_3)_2C_6H_3OH)_2CHCCl_3$ | Diisobutylphenol and chloral. |
| $\alpha,\alpha,\alpha$-Trichloro-$\beta,\beta$-bis (2-hydroxy-5-$tt$-octylphenyl) propane. | $((CH_3)_3CCH_2C(CH_3)_2C_6H_3OH)_2C(CH_3)CCl_3$ | Diisobutylphenol and $\alpha,\alpha,\alpha$-trichloro acetone. |
| $\beta,\beta,\beta$-Trichloro-$\alpha$-phenyl-$\alpha,\alpha$-bis (2-hydroxy-5-$tt$-octyphenyl) ethane. | $((CH_3)_3CCH_2C(CH_3)_2C_6H_3OH)_2C(C_6H_5)CCl_3$ | Diisobutylphenol and $\omega,\omega,\omega$-trichloro acetophenone. |
| $\alpha,\alpha,\alpha,\gamma,\gamma,\gamma$-Hexachloro-$\beta,\beta$-bis (2-hydroxy-5-$tt$-octylphenyl) propane. | $((CH_3)_3CCH_2C(CH_3)_2C_6H_3OH)_2C(CCl_3)_2$ | Diisobutylphenol and hexachloro acetone. |
| $\beta,\beta,\beta$-Trichloro-$\alpha,\alpha$-bis (2-hydroxy-3-methyl-5-$tt$-octylphenyl) ethane. | $((CH_3)_3CCH_2C(CH_3)_2C_6H_2(CH_3)OH)_2CHCCl_3$ | Diisobutyl-o-cresol and chloral. |
| $\alpha,\alpha,\alpha$-Trichloro-$\beta,\beta$-bis (2-hydroxy-3-methyl-5-octylphenyl) propane. | $((CH_3)_3CCH_2C(CH_3)_2C_6H_2(CH_3)OH)_2C(CH_3)CCl_3$ | Diisobutyl-o-cresol and $\alpha,\alpha,\alpha$-trichloro acetone. |
| $\beta,\beta,\beta$-Trichloro-$\alpha$-phenyl-$\alpha,\alpha$-bis (2-hydroxy-3-methyl-5-$tt$-octylphenyl) ethane. | $((CH_3)_3CCH_2C(CH_3)_2C_6H_2(CH_3)OH)_2C(C_6H_5)CCl_3$ | Diisobutyl-o-cresol and $\omega,\omega,\omega$-trichloro acetophenone. |
| $\alpha,\alpha,\alpha,\gamma,\gamma,\gamma$-Hexachloro-$\beta,\beta$-bis (2-hydroxy-3-methyl-5-$tt$-octylphenyl) propane. | $((CH_3)_3CCH_2C(CH_3)_2C_6H_2(CH_3)OH)_2C(CCl_3)_2$ | Diisobutyl-o-cresol and hexachloro acetone. |
| $\beta,\beta,\beta$-Trichloro-$\alpha,\alpha$-bis (2-hydroxy-3-methoxy-5-$tt$-octylphenyl) ethane. | $((CH_3)_3CCH_2C(CH_3)_2C_6H_2(OCH_3)OH)_2CHCCl_3$ | Diisobutyl-guaiacol and chloral. |
| $\beta,\beta,\beta$-Trichloro-$\alpha,\alpha$-bis (2-hydroxy-3-chloro-5-$tt$-octylphenyl) ethane. | $((CH_3)_3CCH_2C(CH_3)_2C_6H_2(Cl)OH)_2CHCCl_3$ | Chloro diisobutylphenol and chloral. |

From the above, it becomes apparent that the invention is susceptible of a great number of modifications and variations within the spirit of the invention. Many other products than those specifically named may be produced in accordance with the disclosure herein and the starting materials for the reaction may differ considerably. Therefore, the invention is to be broadly construed and not to be limited except by the claim appended hereto.

I claim:

The insecticidal and bactericidal products $\beta,\beta,\beta$-trihalo-$\alpha,\alpha$-bis (2 - hydroxy - 3 - alkyl-5-tt-octyl-phenyl) ethanes.

JOSEPH B. NIEDERL.

REFERENCES CITED

The following references are of record in the file of this patent:

UNITED STATES PATENTS

| Number | Name | Date |
| --- | --- | --- |
| 1,986,423 | Arvin | Jan. 1, 1935 |
| 2,329,074 | Muller | Sept. 7, 1943 |